2 Sheets--Sheet 1.

C. ANDERSEN.
Distilling Pure Alcoholic Spirits.

No. 143,654. Patented Oct. 14, 1873.

Witnesses:
Ernst Bilhuber.
W. C. Hauff.

Inventor:
Christian Andersen
per
Van Santvoord & Hauff
Attys

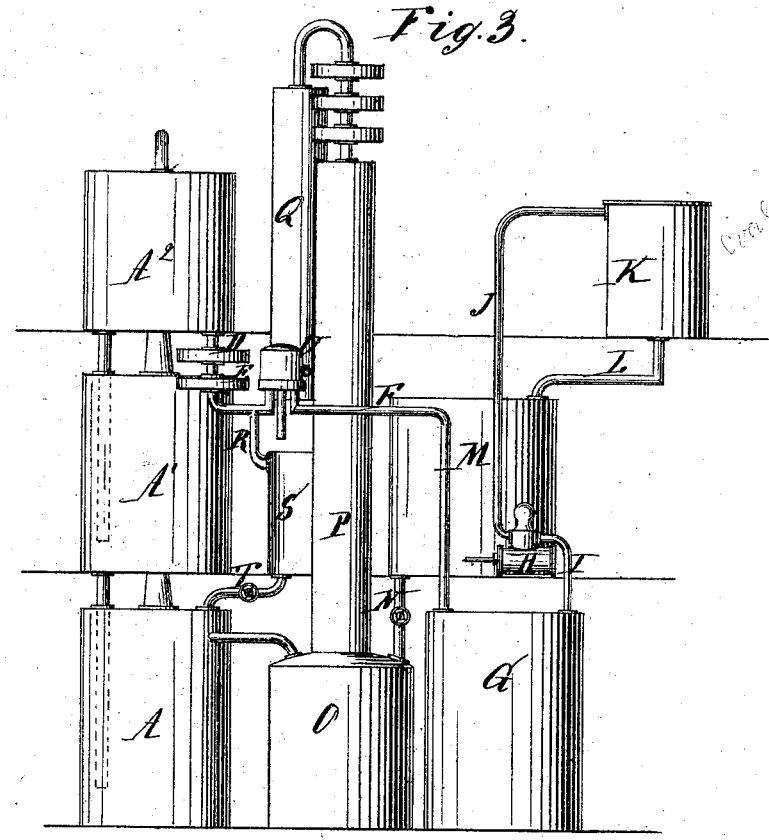

UNITED STATES PATENT OFFICE.

CHRISTIAN ANDERSEN, OF BROOKLYN, NEW YORK.

IMPROVEMENT IN DISTILLING PURE ALCOHOLIC SPIRITS.

Specification forming part of Letters Patent No. 143,654, dated October 14, 1873; application filed July 17, 1873.

*To all whom it may concern:*

Be it known that I, CHRISTIAN ANDERSEN, of Brooklyn, in the county of Kings and State of New York, have invented a new and useful Improvement in Distilling Alcoholic Liquids; and I do hereby declare the following to be a full, clear, and exact description thereof, which will enable those skilled in the art to make and use the same, reference being had to the acccompanying drawing forming part of this specification, in which drawing—

Figure 1:
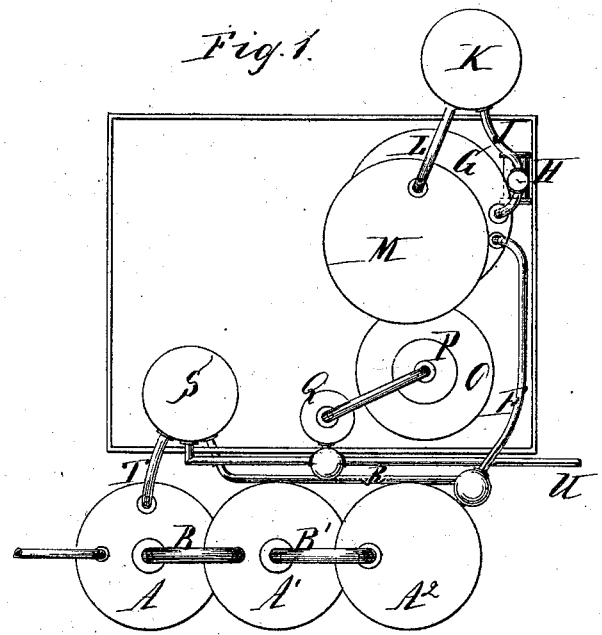
Figure 2:
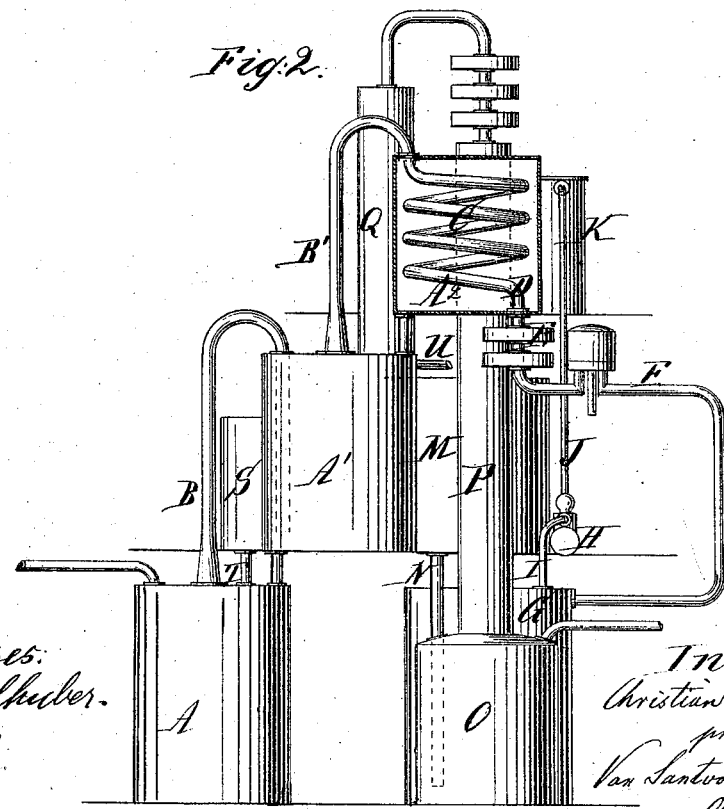

Figure 1 represents a plan or top view of the apparatus which I use in carrying out my invention. Fig. 2 represents a side view of the same in the direction of arrow 1, Fig. 1. Fig. 3 is a front view of the same in the direction of arrow 2, Fig. 1.

Similar letters indicate corresponding parts.

This invention consists in the arrangement of a double-acting pump, the suction-pipe of which connects with a cistern in which collects the vapors or liquids escaping from the mash-tun or mash-tuns, while the delivery-pipe of said pump connects with a vessel that is filled with animal or vegetable coal, and communicates with an alcoholic still in such a manner that, by the action of the pump, the vaporization of the mash is facilitated, and that the liquids resulting from the condensation of the vapors which escape from the mash-tun are brought in intimate contact with a quantity of animal or vegetable coal, and thereby said liquids are freed from noxious impurities before they pass into the alcohol-still.

In the drawing, the letters A A¹ A² designate three mash-tuns, which are arranged one above the other, and which communicate with each other by means of goose-necks B B'. The goose-neck B', which rises from the mash-tun A¹ connects with a worm, C, situated in the interior of the tun A², and from the bottom end of this worm extends a pipe, D, which passes through coolers E and communicates, by means of the tail-pipe F, with a cistern, G. H is a double-acting pump, the suction-pipe I of which extends down into the cistern G close to its bottom, while the delivery-pipe J of said pump communicates with a vessel, K, which is filled with animal or vegetable coal, and from its bottom extends a pipe, L, which leads into a cistern, M. From the bottom of this cistern emanates a pipe, N, which leads into the alcohol-still O. From this still rises a column, P, which connects with a condenser, Q, both of the usual construction.

From both tail-pipes F and U extend pipes R to the low-wine cistern S, which communicates, by a pipe, T, with the first mash-tun A.

The rectified spirit escapes from the condenser through the lower tail-pipe U.

In working my apparatus I charge the mash-tuns A A¹ A² in the usual manner, and then I heat the contents of the first mash-tun by admitting steam. The vapors escaping from this mash-tun pass into the second mash-tun A¹, so as to heat the mash therein, and the vapors escaping from the second mash-tun pass up through the goose-neck B', and then down through the coil C in the tun A², the heat which radiates from this coil serving to heat the contents of said tun. On leaving the coil C the vapors pass through the coolers E to the cistern G, where they collect in a liquid state.

By the action of the pump H the liquid from the cistern G is forced through the coal contained in the vessel K, and by these means the atmosphere in the cistern G is rarefied, and the vaporization of the mash is facilitated. At the same time the liquid which is forced through the carbon-vessel K is freed from its noxious constituents, and it collects in the cistern M in a comparatively pure state, so that when the same enters the still O and is subjected to the rectifying process it yields a pure and clear spirit.

What I claim as new, and desire to secure by Letters Patent, is—

1. The arrangement of a double-acting pump, H, in combination with a set of mash-tuns with a receiving-cistern, G, a carbon-vessel, K, and a rectifying-still, O, all constructed and operating substantially in the manner herein shown and described.

2. The within-described process of distilling alcoholic liquids by forcing the products resulting from the vaporization of mash through a vessel containing carbon previous to introducing said liquid into the rectifying-still, as set forth.

CHRISTIAN ANDERSEN.

Witnesses:
 W. HAUFF,
 E. F. KASTENHUBER.